Figure 1:
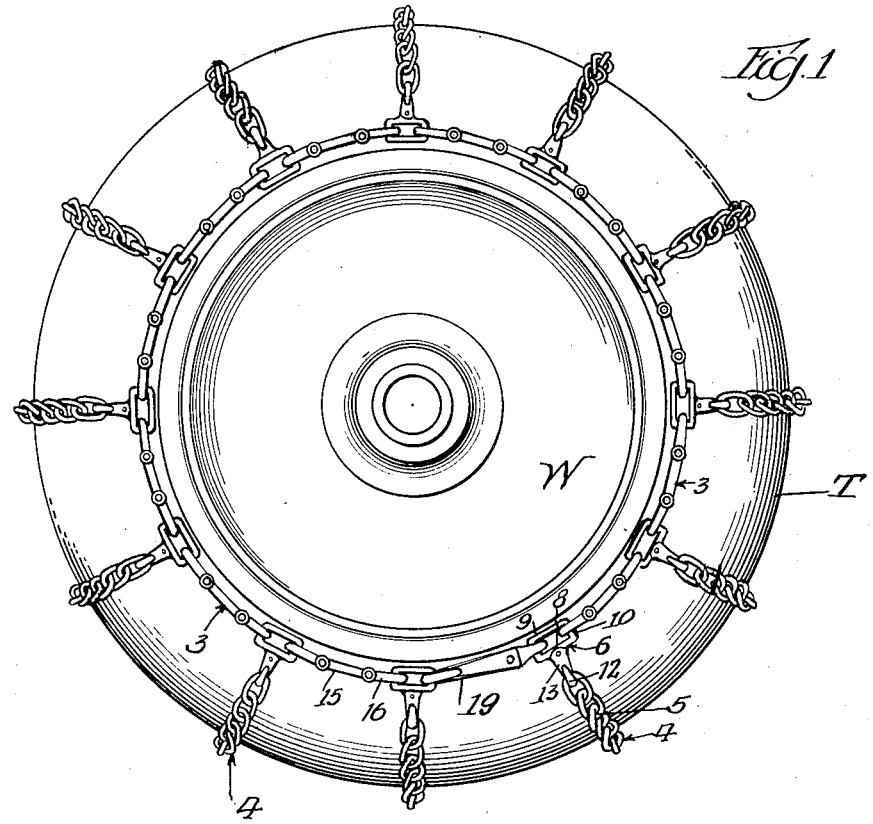

Nov. 7, 1933.  G. I. DE VAULT  1,934,173

TIRE CHAIN

Filed Jan. 26, 1931

Inventor
George I. De Vault
By Fred Gerlach
his Atty.

Patented Nov. 7, 1933

1,934,173

UNITED STATES PATENT OFFICE 1,934,173

TIRE CHAIN

George I. De Vault, Chicago, Ill.

Application January 26, 1931. Serial No. 511,247

3 Claims. (Cl. 152—14)

The invention relates generally to chains. More particularly the invention relates to that type of chain which is designed primarily to be used on the tire of a vehicle wheel to increase traction and prevent skidding, and comprises a pair of substantially circular side chains for engaging the sides of the tire and an annular series of cross chains which are connected to the side chains and extend transversely across the tread portion of the tire.

One object of the invention is to provide a chain of this type in which the links of the side chains that are associated with the cross chains are substantially rectangular in conformation and are provided at the sides thereof with hooks which operate to connect detachably the ends of the cross chains to the side chains and permit the cross chains to be readily removed for repair or replacement purposes.

Another object of the invention is to provide a chain of the type here under consideration in which the links of the side chains that extend between and connect the hook-equipped links are constructed in a novel manner and are adapted to engage or stretch longitudinally to a limited degree in response to strain or lateral displacement of the cross chains.

A further object of the invention is to provide a tire chain which may be manufactured at a low and reasonable cost, is extremely durable and may be quickly and readily applied.

Other objects of the invention and the various advantages and characteristics of the present chain construction will be apparent to those skilled in the art from a consideration of the following detailed description.

The invention consists in the several novel features which are hereinafter set forth and are more particularly defined by claims at the conclusion hereof.

Figure 2:
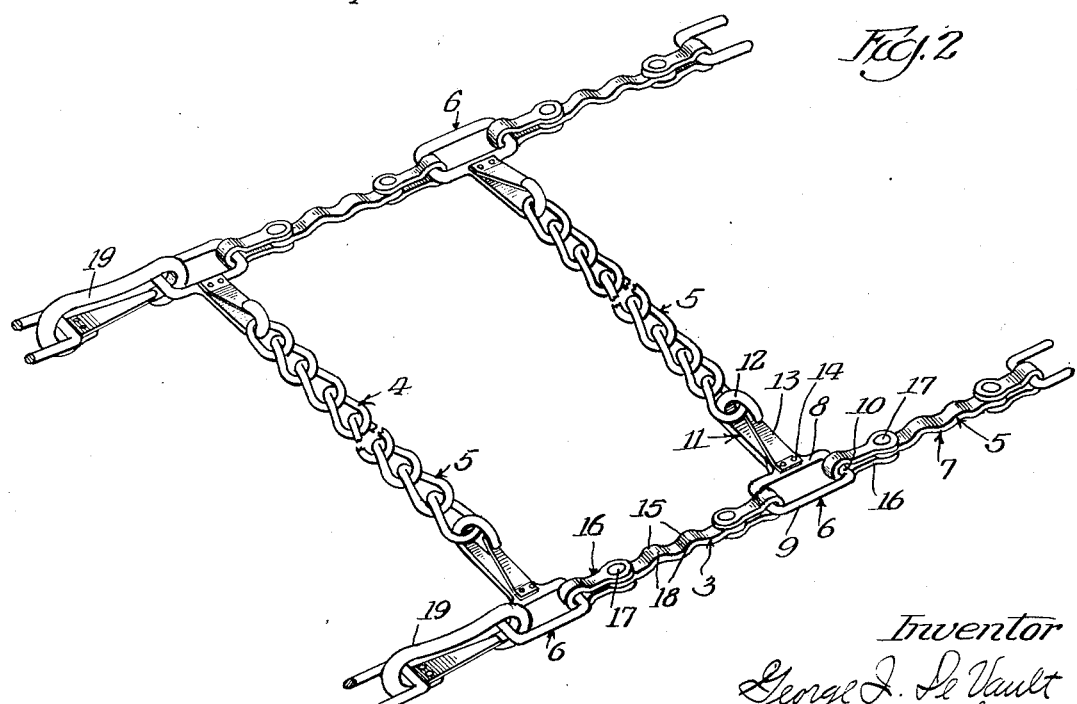

In the drawing which accompanies and forms a part of this specification or disclosure and in which like numerals of reference denote corresponding parts throughout the several views:

Fig. 1 is a side elevation exhibiting a chain embodying the invention in its operative position with respect to the tire of a vehicle wheel; and Fig. 2 is a perspective illustrating in detail the construction of the side chains and the manner in which the hooks on the rectangular links connect detachably the cross chains to the side chains.

The chain which forms the subject matter of the invention is designed primarily for use in connection with a pneumatic tire T on a vehicle wheel W and serves, when in its operative position, to increase traction and prevent skidding of the wheel. It is formed of standard parts and consists of a pair of side chains 3 and a series of cross chains 4. The side chains 3 are adapted, when arranged in circular form, to fit against the sides of the tire T of the vehicle wheel. The cross chains 4 extend between the side chains and are adapted, when the side chains are in their operative position, to lap the tread portion of the tire in order to increase traction and prevent skidding as well understood in the art.

The cross chains 4 are of uniform length and consist of links 5. The latter are formed of metal and are connected together as clearly illustrated in Figs. 1 and 2.

The side chains 3 comprise a set of links 6 and a set of links 7. The links 6 alternate with the links 7 and are preferably formed of steel or some other durable and comparatively hard metal. They are rectangular in conformation and consist of inner side parts 8, outer side parts 9 and end parts 10. The end parts are formed integrally with the ends of the side parts 8 and 9 and hold the latter in spaced relation. The inner side parts 8 of the links 6 are provided with hooks 11. The latter consist of hook parts 12 and tongues 13 and serve, as illustrated in the drawing, to connect detachably the cross chains 4 to the side chains 3. The hook parts 12 of the hooks 11 are formed integrally with the side parts 8 of the links 6 and are arranged so that they face outwardly from the sides of the tire when the chain proper is in its operative position. They are adapted to extend through the links 5 at the ends of the cross chains 4 so as to effect the desired connection between the cross chains and the side chains. The tongues 13 are formed of spring metal and extend between the inner side parts 8 of the links 6 and the hooked ends of the hook parts 12. The outer ends of the tongues are connected by rivets or studs 14 to the portions of the parts that are formed integrally with the inner side parts 8. The inner ends of the tongues engage the aforesaid hooked ends of the hook parts 12 and lock the end links 5 of the cross chains against displacement when they are connected to the hooks 11. Connection of the end links 5 of the cross chains and the hooks 11 is effected by depressing the tongues 13 so as to open the hooks for insertion of the links at the ends of the cross chain. After insertion of the end links of the cross chains, the tongues 13 are released so as to connect the cross chains 4 in place. By utilizing the hooks 11 to connect the cross chains to the side chains, the cross chains may be readily removed for repair or replacement purposes. This is of considerable advantage in that the cross chains, during use of the chain proper, wear quickly and often break.

The links 7 of the side chains 3 consist of elongated metallic strips 15 and U-shaped members 16. The U-shaped members encircle the end parts 10 of the links 6 and are formed of strip metal. The ends of the strips 15 extend between the legs of the U-shaped members 16 and are pivotally connected to the latter by means of studs 17. These studs are carried by the legs of the U-shaped members 16 and are beaded or riveted over at the ends thereof so as to prevent axial displacement. The central portions of the strips 15 are bent back and forth to form curved parts 18. The latter permit the strips 15 to stretch or yield longitudinally in response to the action of the cross chains 4 when the latter are brought successively into engagement with the ground during rotation of the wheel W. By utilizing the curved parts 18 at the central or intermediate parts of the strips 15, the life of the chain is materially increased in that the side chains 3 are yieldable longitudinally to a limited extent. The studs 17 are arranged so that the U-shaped members 16 are free to swing in the direction of the hooks 11. As a result of this arrangement, the side chains 3 are flexible and may be readily applied to the tire of the wheel. To connect the side chains 3 in place around the tire T of the wheel W, a pair of clips 19 are provided. These clips are positioned one opposite to the other and are connected as illustrated in Fig. 2 to two of the links 6 of the side chains 3. The clips are in the nature of hooks and are adapted, when shifted into place, to hold the ends of the side chains in place.

In applying the chain to the tire T of the wheel W, the side chains 3 are positioned around the sides of the tire and are connected in place by means of the clips 19. When the side chains are connected in place, the cross chains 4 extend around and lap the tread portion of the tire T. In the event that the cross chains 4 break or become worn during use of the chains, it is only necessary to remove the worn or broken cross chains from the side chains 3 by releasing the end links 5 from the hooks 11. In replacing the cross chains, the end links of the replacement chains are connected to the hooks 11 by depressing the tongues 13 as previously described. Withdrawal of the chain from the tire is effected by releasing the clips 19 and withdrawing the side chains 3 from the tire.

The tire chain disclosed herein may be manufactured at a comparatively low cost and is extremely efficient in operation. It may be readily applied to a tire and permits of easy and quick repair by virtue of the fact that the cross chains are detachably connected to the side chains by means of hooks.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tire chain, the combination of a pair of laterally spaced side chains adapted to fit around opposite sides of the tire and including at substantially equidistantly spaced intervals one-piece, metallic strips having the central parts thereof bent back and forth in a curved formation so that they are longitudinally resilient and permit the side chains to give during use thereof, and a plurality of tread engaging cross chains extending between and connected to the side chains at points between the one-piece strips.

2. In a tire chain, the combination of a pair of laterally spaced side chains adapted to fit around opposite sides of the tire, consisting of substantially rectangular links and pivot links between and alternating with the rectangular links, each of said pivot links comprising a one-piece, substantially rigid, metallic strip having the central part thereof bent back and forth into curved formation so that it is longitudinally resilient, and a pair of U-shaped members encircling the ends of the two adjoining rectangular links and having the ends thereof connected pivotally to the ends of the strip, a plurality of tread-engaging cross chains between the side chains, and snap hooks formed integrally with and projecting outwardly from the rectangular links and operative to connect the cross chains detachably to the side chains.

3. In a tire chain, the combination of a pair of laterally spaced side chains adapted to fit around opposite sides of the tire and consisting of substantially rectangular links and pivot links between and alternating with the rectangular links, said pivot links comprising U-shaped members encircling the ends of the rectangular links and one-piece metallic strips having the central parts thereof bent back and forth in a curved formation so that they are longitudinally resilient and having their end parts extending between and connected pivotally to the legs of the U-shaped members and a plurality of tread-engaging cross chains extending between the side chains and having the ends thereof connected to the rectangular links.

GEORGE I. DE VAULT.